Jan. 7, 1969 S. MEURER ET AL 3,420,216
SPARK IGNITION FOR AN INTERNAL COMBUSTION
ENGINE WITH FUEL INJECTION
Filed Dec. 1, 1966

INVENTORS
Siegfried Meurer
Horst Querfurt
Walter Herzog
BY Bailey, Stephens and Huettig
ATTORNEYS

United States Patent Office 3,420,216
Patented Jan. 7, 1969

3,420,216
SPARK IGNITION FOR AN INTERNAL COMBUSTION ENGINE WITH FUEL INJECTION
Siegfried Meurer, Horst Querfurt, and Walter Herzog, Nuremberg, Germany, assignors to Maschinenfabrik Augsburg-Nurnberg Aktiengesellschaft Werk Nurnberg, Nuremberg, Germany
Filed Dec. 1, 1966, Ser. No. 598,400
Claims priority, application Germany, Dec. 2, 1965, M 67,496
U.S. Cl. 123—32     2 Claims
Int. Cl. F02b *3/00;* F02f *11/00;* F02p *1/00*

ABSTRACT OF THE DISCLOSURE

The piston for a spark ignition internal combustion engine with fuel injection has a guide channel leading to a cutaway in the wall of a combustion chamber. At top dead center a sleeve around the spark electrode enters the cutaway. Injected fuel particles are led by the guide channel to the bottom of the cutaway from which the rising piston throws the particles into the sleeve in the form of a fuel rich air mixture for ready ignition.

---

This invention relates to a foreign ignition fuel injection internal combustion engine having a combustion chamber in the shape of a body of rotation arranged in the crown of the piston head. The foreign ignition member of this engine is a sparkplug or a glow plug, the sparkplug having a sleeve around it or the glow plug being surrounded by a sleeve with a space in between. All or the major part of the liquid fuel is applied onto the combustion chamber wall as a thin film by one or more fuel jets under the action of a unidirectional air swirl. An inevitable slight separation of solid fuel particles from the surface of the fuel jet or jets occurs.

As disclosed in U.S. Patents Nos. 3,107,658 and 3,244,159, it has been proposed in this connection to associate with the ignition member certain fuel guiding elements arranged on the combustion chamber wall in the shape of guiding channels or deflection baffles by which particles of the fuel film and, possibly, even fuel droplets would be directed into the spark or glow plug sleeve for mixing with the air available there, or additionally mixing with the air where some mixing took place on the way of the fuel to the ignition member. This relatively small amount of fuel/air mixture is ignited by the ignition member and flashes as a pilot flame into the combustion chamber in the piston. In the combustion chamber, the mixture consisting of vaporized fuel film and combustion chamber air is ignited. Regarding the arrangement of the guiding channels or baffles it has hitherto been the object to cause the deflected fuel film particles and/or fuel droplets to be directed by such guiding elements to the ignition member essentially from below, that is, through the open end of the sleeve or enclosure. It has now been found that the performance of such an ignition member can be substantially improved, especially in the light load range with its high amount of excess air, as a result of the qualitative governing system of this invention without any throttle.

According to the invention, this is achieved by providing a guide channel in the combustion chamber wall which is open into the chamber. Fuel particles from the fuel film are directed through the guiding channel into the space of a hole or cutaway formed in the piston crown for communicating with the ignition member. The end of the guide channel intersects the wall of the cutaway and the said cutaway has a solid bottom. The spark or glow plug sleeve is open only at its combustion chamber end.

In a foreign ignition fuel injection internal combustion engine with a compression ratio higher than that of an Otto-cycle engine, these features enable the following to be achieved.

The fuel jet direction and fuel injection period are so selected that parts of the fuel film travel through the guiding channel at the appropriate time into the cutaway in the piston head for the ignition member and mix with the air available there. By directing a fuel fraction in this manner, a fuel air mixture that is considerably enriched with fuel and specially suited for ignition can form within the cutaway. As the cutaway has a solid bottom, this fuel-air mixture is moved in the direction towards the spark or glow plug sleeve before the piston reaches top dead center and while the piston still moves is shot up or thrown by the bottom of the cutaway. Near and at the top dead center of the piston, the sleeve of the ignition member plunges into the hole and receives the mixture enriched with fuel at the correct time of the cycle. When the piston suddenly comes to rest, if only for a very short time at the top dead center, this mixture will continue its motion unimpeded, according to the well-known law of inertia, in its previous direction by the kinetic energy imparted to it by the piston. It is thrown off the bottom of the cutaway, shoots into the spark or glow plug sleeve and is ignited by the spark or other ignition device to form an ignition flame.

This invention is more fully described with reference to the accompanying drawings in which.

Figure 1:
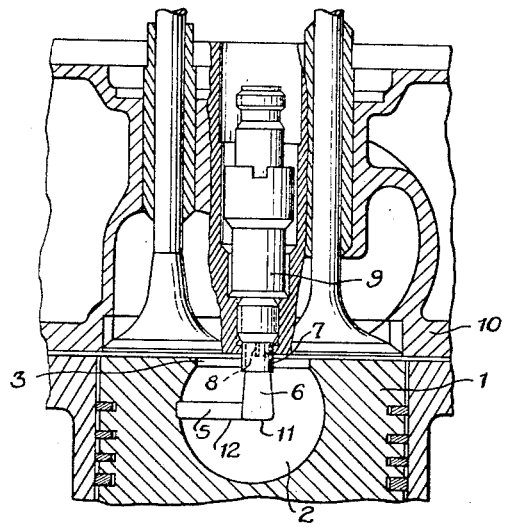
FIGURE 1 is a cross-sectional view through the cylinder and cylinder head of this invention.
Figure 2:
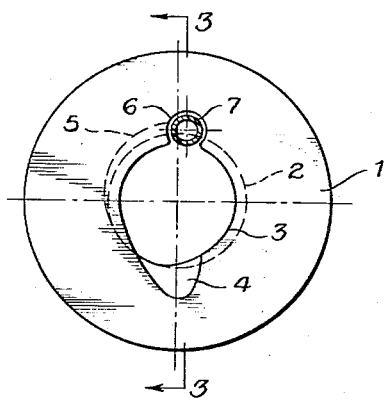
FIGURE 2 is a plan view of the piston head including a portion of the ignition member sleeve.
Figure 3:
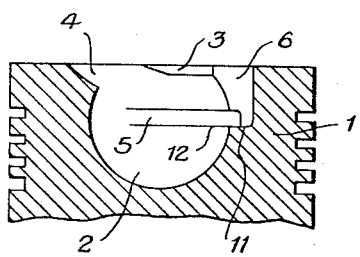
FIGURE 3 is a cross-sectional view taken on the line 3—3 of FIGURE 2.

As shown in FIGURE 1, the engine piston 1 has a combustion chamber 2 in the piston head which is spherical in this embodiment and has a constricted opening 3. The liquid fuel is injected through recess 4 by a nozzle not specifically shown in this drawing, with the timing selected to suit the type of operating conditions and the type of fuel with regard to the distillation temperature and ignition quality. In the embodiment shown, there is a guide channel 5 roughly at the periphery of the combustion chamber wall and which is open into the combustion chamber. This guide channel may, for example, be parallel with the piston crown plane, but this is not absolutely necessary and a different arrangement may be adopted, the essential feature being that the above-mentioned effect of throwing the fuel-air mixture towards the ignition device is achieved. Roughly diametrically opposite to the recess 4 there is a hole or cutaway 6 in the piston head into which the sleeve 7 surrounding and spaced from the spark electrode 8 in a sparkplug 9 is screwed into the cylinder head 10. Sleeve 7 plunges into cutaway 6 near and at the top dead center of the piston as shown in FIGURE 1. The hole 6 is open towards the combustion chamber 2 in the fashion of a slot as shown in FIGURE 2 and has a bottom 11 serving as a thrower pursuant to the purpose of this invention. One end of the guide channel 5 intersects the wall of the cutaway 6 and the lower side wall 12 of the guide channel may be in the same plane as the bottom 11 to blend into the cutaway. This is shown in FIGURES 1 and 3.

Having now described the means by which the objects of the invention are obtained,

We claim:

1. An internal combustion engine comprising a cylinder having a longitudinal axis, a piston in said cylinder, a combustion chamber in said piston, means for injecting fuel onto the wall of said chamber to form a film of fuel, means for forming a unidirectional air swirl in said chamber for mixing air with fuel vaporized from said film, a fuel ignition member communicating with said chamber, a sleeve surrounding said member and spaced therefrom and having an open end directed toward said chamber, a cutaway in the chamber wall for receiving the open end of said sleeve at piston top dead center and having a bottom, and open guide channel means in said chamber wall and having a lower side wall leading into said bottom for directing particles of fuel from the film of fuel on said chamber wall onto said bottom of said cutaway for being thrown from said bottom at said piston top dead center into said sleeve for ignition by said ignition member.

2. An engine as in claim 1, said open channel means having a length of approximately 90° of the largest circumference of said chamber wall.

References Cited

UNITED STATES PATENTS

| | | | |
|---|---|---|---|
| 2,942,591 | 6/1960 | Meurer | 123—32 |
| 2,995,121 | 8/1961 | Meurer | 123—32 |
| 3,083,700 | 4/1963 | Madak et al. | 123—32 |
| 3,107,658 | 10/1963 | Meurer | 123—32 |
| 3,244,159 | 4/1966 | Meurer | 123—32 |

LAURENCE M. GOODRIDGE, *Primary Examiner.*

U.S. Cl. X.R.

123—146.5, 193